United States Patent [19]

Organ

[11] Patent Number: 5,781,554
[45] Date of Patent: Jul. 14, 1998

[54] METHOD AND APPARATUS FOR COMMUNICATING BETWEEN NODES IN A COMMUNICATIONS NETWORK

[75] Inventor: Rupert J. Organ, London, Great Britain

[73] Assignee: British Telecommunications public limited company, London, England

[21] Appl. No.: 687,386

[22] PCT Filed: Jan. 20, 1995

[86] PCT No.: PCT/GB95/00108

§ 371 Date: Aug. 15, 1996

§ 102(e) Date: Aug. 15, 1996

[87] PCT Pub. No.: WO95/21497

PCT Pub. Date: Aug. 10, 1995

[30] Foreign Application Priority Data

Feb. 4, 1994 [GB] United Kingdom ............... 9402210

[51] Int. Cl.[6] ....................................... H04J 3/24
[52] U.S. Cl. .................. 370/474; 370/235; 370/395; 370/471
[58] Field of Search .................... 370/230, 235, 370/236, 238, 252, 253, 468, 470, 471, 473, 474, 528, 395, 476

[56] References Cited

U.S. PATENT DOCUMENTS

| | | | |
|---|---|---|---|
| 4,769,815 | 9/1988 | Hinch et al. | 370/236 |
| 4,771,391 | 9/1988 | Blasbalg | 370/238 |
| 5,051,983 | 9/1991 | Kammerl | 370/474 |
| 5,193,151 | 3/1993 | Jain | 370/230 |
| 5,206,858 | 4/1993 | Nakano et al. | 370/474 |
| 5,381,404 | 1/1995 | Sugano et al. | 370/238 |
| 5,537,446 | 7/1996 | Lakshman et al. | 370/253 |

*Primary Examiner*—Wellington Chin
*Assistant Examiner*—Soon-Dong Hyun
*Attorney, Agent, or Firm*—Nixon & Vanderhye P.C.

[57] ABSTRACT

A method and apparatus for communicating over a communications network includes determining a time delay between transmission and reception of data block between nodes in the network and controlling the amount of data transmitted in the data blocks according to the determined time delay, the time delay produced by assembling the data blocks is modified thereby controlling the overall system time delay which includes a transmission path delay and a delay caused by the assembly of the data block by the network nodes.

14 Claims, 2 Drawing Sheets

METHOD AND APPARATUS FOR COMMUNICATING BETWEEN NODES IN A COMMUNICATIONS NETWORK

BACKGROUND OF THE INVENTION

1. Field of the Invention

This invention relates to a method and apparatus for communicating between nodes in a communications network, particularly, but not exclusively, an asynchronous transfer mode network for communicating delay sensitive low rate isochronous services such as voice data.

2. Related Art

In asynchronous transfer mode (ATM) networks a node on the network transmits data to another node in the network by loading the data into a cell which travels through the network. Taking, for example, a single telephone source or a number of telephone sources, the data will comprise regularly taken samples of the analogue voice information which is digitised. Once a buffer in the node has sufficient information to fill the cell the data block is transmitted to the other node. Subsequently further cells are filled in a similar manner and transmitted to the other node.

It will be appreciated that the voice information from one telephone conversation may be split up into samples which are transmitted in different cells and time delays which are perceivable by a telephone user can occur because of the need for each node to "gather" or receive enough information to fill a cell. The time delays manifest themselves as echoing, and although echo cancelling equipment is available which can alleviate this problem, such equipment is expensive and not always reliable. This has led to the belief that ATM is not a suitable technology to serve voice traffic or other delay sensitive low rate isochronous services.

The present invention arose from a realisation by the inventor that the currently perceived requirement to fill each cell with data does not need to be a rigid requirement. By only partially filling a cell with data, it would be possible to reduce the time delay introduced into the communications network by the buffering process used by each transmitting node. For example, it would be possible for a node to utilise one cell to transmit just one digitized sample from one telephone conversation. This would, of course, lead to an excessive load on the asynchronous transfer mode network because the other information that would have been carried by that cell would now have to be carried by other cells.

EP-A-0415843 discloses a data communication system for communicating data between nodes of the system. When a source node sends data to a destination node it splits the data into packets of, for example, 512 bytes each. In order to avoid congestion occurring in the system the maximum number of packets the source node can send at any given time, or the maximum rate at which it can send packets, is controlled in accordance with the round-trip delay between source and destination nodes. The maximum number or maximum rate is controlled to be higher for smaller delays and lower for larger delays.

SUMMARY OF THE INVENTION

According to a first aspect of the invention there is provided a method of communicating data in blocks between first and second nodes in a communications network, the method comprising determining a time delay between transmission and reception of data blocks between the nodes and communicating the data in blocks the amount of data in each of which is controlled in accordance with the time delay thus determined, the amount of data in each block being controlled to be larger for smaller delays and smaller for larger delays, characterised in that the blocks are communicated within respective data cells which all have the same data-carrying capacity so that the fill factor of each cell is higher for smaller delays and lower for larger delays.

By determining the time delay between transmission and reception of data blocks between nodes and controlling the amount of data in each of the data blocks in accordance with the determined time delay it is possible to compromise between the load on the network and the time delay introduced by the node assembling the data into a data block prior to transmission.

For example, where the network has a low transmission path delay it may by tolerable to use a node's full buffer capacity to ensure that the amount of data in each data block is the maximum that can be contained in a cell before the data block is transmitted. If the transmission path has a relatively large time delay, in order to improve the quality of service by reducing performance factors like echo, it will be possible to reduce the amount of data in each data block so allowing the data block to be transmitted without having to wait for the buffer to fill to full capacity.

By data block is meant a discrete block or collection of data rather than a continuous data stream.

Preferably, the fill factor of the cells is determined by referring the determined time delay to a look-up table of appropriate cell fill factors corresponding to respective members of a set of time delays.

In some networks, the time delay may comprise a delay induced by a transmission path from the first node to the second node alone or this delay doubled to take into account the return path. Preferably, the time delay is determined for a communication path comprising a path from the first node to the second node and a path from the second node to the first node. Thus, the outgoing and return path of the network is considered. The path may be direct between the nodes or via other network nodes. The path could be the same for both directions or different. For example, the return path could involve more nodes in the network than the outward path or vice versa.

Preferably, the communications network operates in asynchronous transfer mode.

Preferably, each cell contains information indicating the amount of data contained in that cell. This may be such as to make it possible for the receiving node to determine the last item of data in the cell and to differentiate between that last piece of data and that part of the cell which is empty. Alternatively, the cell could include information indicating the location of the data within that cell. Thus, the cell may be organised time wise such that information within the leading portion of the cell points to the location of the data within the rest of the cell. The advantage of this will be appreciated when consideration is given to the processing of a received cell which is not a "full" cell. In such a cell there will be a part which contains useful data and a part which is "empty" in the sense that it does not contain useful data (although it could contain "dummy" non-useful data present just to fill the cell). It will thus save processing time if the "empty" part can be discarded and the useful data processed without delay.

According to a second aspect of the invention there is provided a communications network including first and second nodes, first means for communicating data in blocks between the nodes, second means for determining a time delay between transmission and reception of data blocks between the nodes, and third means for controlling the amount of data in each block to be larger for smaller delays and smaller for larger delays, characterised in that the first means is arranged to communicate the blocks in respective data cells which all have the same data-carrying capacity so that the fill factor of each cell will be controlled by the third means to be higher for smaller delays and lower for larger delays.

BRIEF DESCRIPTION OF THE DRAWINGS

A specific embodiment of the invention will now be described, by way of example only, with reference to and as illustrated by the drawings in which.

DETAILED DESCRIPTION OF EXEMPLARY EMBODIMENTS

Figure 1:
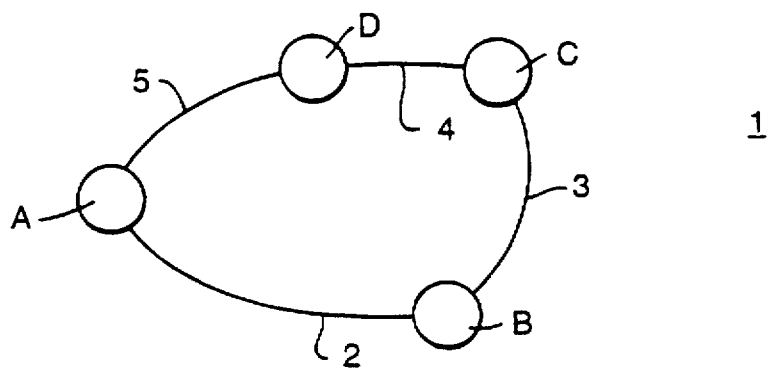
FIG. 1 shows a communications network comprising a number of nodes and transmission path links in schematic form.

FIG. 1 shows a communications network 1 comprising network nodes A, B, C and D linked together by transmission paths 2, 3, 4 and 5. Nodes A and B are linked together by transmission path 2; node B is linked by transmission path 3 to node C; node C is linked by transmission path 4 to node D; node D is linked by transmission path 5 to node A. The transmission paths are formed from optical fibre in a manner well known to a man skilled in the art of communications. The communications network 1 operates in Asynchronous Transfer Mode (ATM).

Figure 2:
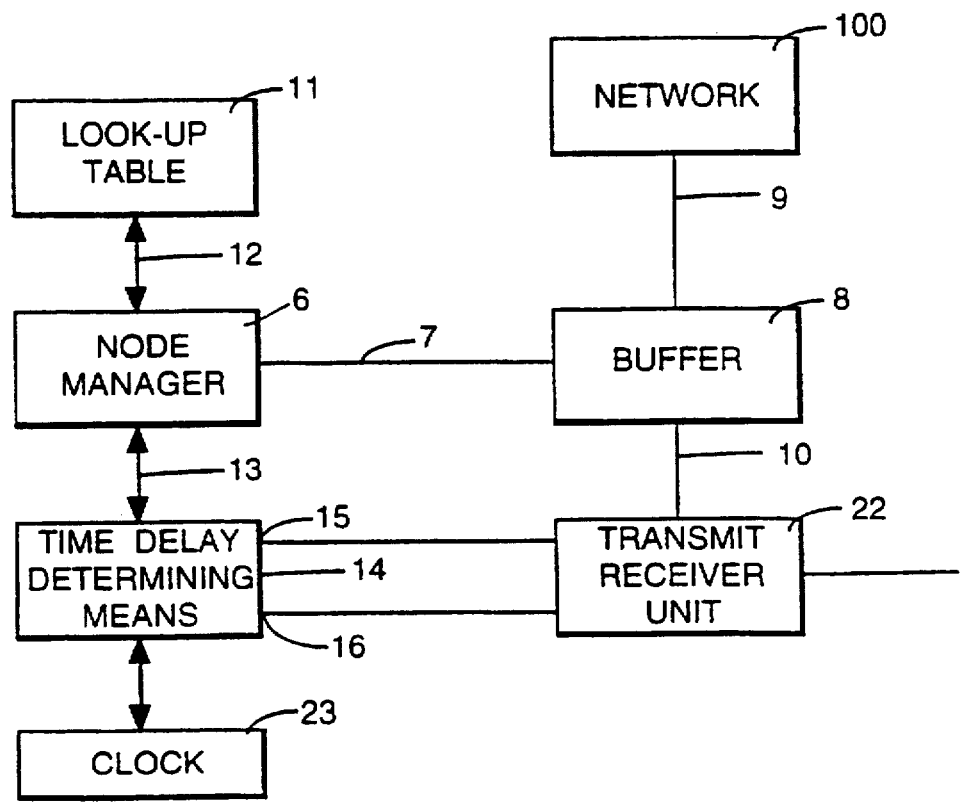
FIG. 2 shows in schematic block diagram form a node of the network shown in FIG. 1.

The nodes A, B, C and D are all nominally identical. As is shown in FIG. 2, each node comprises a node manager 6 linked by a data bus 7 of known type to a buffer 8. The buffer 8 has a data input 9 and output 10. The data input 9 is connected to a telephone network 100 served by node A in a known manner and permits voice data to enter the buffer 8 from the telephones in that network after a data mapping operation by an application layer such as AAL-1. AAL-1 is a process well known to those versed in the art of communications. Data output 10 provides a transmission path for the data to be transmitted as a data block from the node onto one of the transmission paths to which the node has access. The data block is transmitted by means of a transmitter receiver unit 22. The node manager 6 is also connected to a lookup table 11 by means of a data bus 12 and by a data bus 13 to a transmission path time delay determining means 14. The time delay determining means 14 has an input 15 and output 16 connected to the transmitter receiver unit 22 and a further databus connected to a node clock 23.

The lookup table 11 comprises a data store containing a set of time delays and associated appropriate cell filling factors.

Let us suppose that node A wishes to communicate with node B. From FIG. 1, it will be readily appreciated that the communication can take place by a direct path 2, direct in the sense that it has few intervening nodes and a short transmission path, or by a longer path comprising paths 4, 3, 5, node C and node D.

The first stage in the communication process is for node A to determine the time delay introduced by the chosen transmission path. The node manager 6 instructs the time delay determining means 14 to send a test data block in an ATM cell from node A to node B from the transmitter and receiver unit 22. This cell contains data representative of the time of its transmission from node A by the transmitter and receiver unit 22 which is written into the cell by the time delay determining means 14 after reference to a local clock 23. When this cell is received by node B it is immediately returned to node A. The time delay determining means 14 notes the time of receipt of this cell with reference to the clock 23 and determines the time delay of the transmission path between node A and node B by finding the difference between the noted time of receipt and the time of transmission which is recorded in the data carried by the cell.

The determined time delay is then passed back to the node manager 6 which compares it with various time delays stored in the look-up table 11 in order to select a suitable cell filling factor. The buffer 8 is then controlled by the node manager 6 in accordance with the factor to assemble or load voice data received from the network 100 into the next ATM time division or cell in the following manner.

Voice data derived from one of the telephones served by the node A is mapped by an adaptation layer, for example AAL-1, in a manner well known to those skilled in the art into a form suitable for loading into a segmentation and reassembly protocol data unit (SAR-PDU). The SAR-PDU in a typical network will be 48 octets in length, with 47 octets usable by data. The SAR-PDU travels through the network in the cell. The loading process is carried out by the buffer 8 under the control of the node manager 6.

Figure 3:
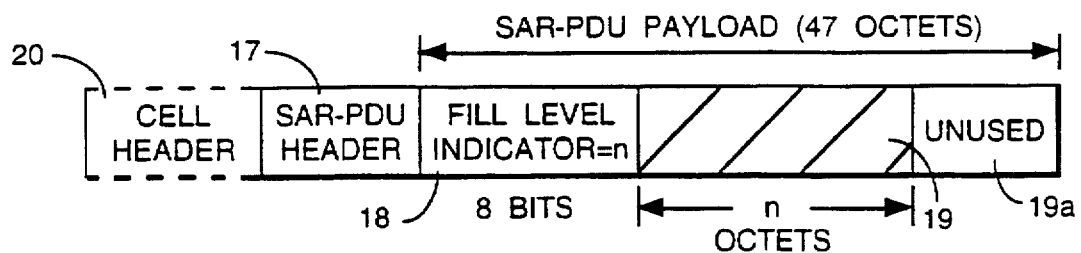
FIGS. 3 to 5 show in schematic form data blocks transmitted by nodes on the network shown in FIG. 1.

The SAR-PDU is shown in FIG. 3 and it can be seen that it comprises a unit header 17, a fill level indicator field 18, and a user data field 19, a portion 19A of which is unused. The fill level indicator field 18 and the user data field 19 may occupy up to 47 octets and can be thought of as the payload of the SAR-PDU. The header 17 is one octet in length and the 48 octet SAR-PDU is preceded in the ATM cell by a cell header 20. The fill level indicator field 18 contains a fill level indicator which is derived by the node manager 6 from the fill level factor obtained from the lookup table and passed to the buffer 8 for loading into the SAR-PDU. Typically this will be 1 to 46 decimal or 000000001 to 00101110 binary.

The purpose of the fill level indicator is to indicate how much or rather how many octets of data are included in the SAR-PDU. Thus, the end of the user data 19 and the beginning the unused portion 19a can be readily determined by the receiving node, node B which can then verify that it has received all the data and that the SAR-PDU has not been corrupted during transmission.

FIG. 3 shows the type of SAR-PDU that would be transmitted from node A if there was a relatively large time delay in the transmission path to node B. This could be the case when the transmission path includes nodes D and C.

Figure 4:
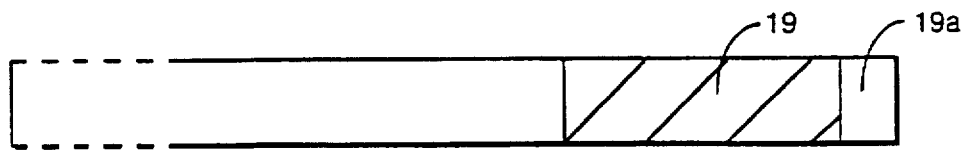

If a lower time delay path is chosen for the communications circuit between node A and node B, for example, if path 2 is chosen, then a longer buffer generated time delay is acceptable and more voice data may be packed into the SAR-PDU. The fill level indicator is recorded as a larger number reflecting an expansion of the user data area and a corresponding contraction of the unused portion 19A. Such a situation is illustrated in FIG. 4.

Figure 5:
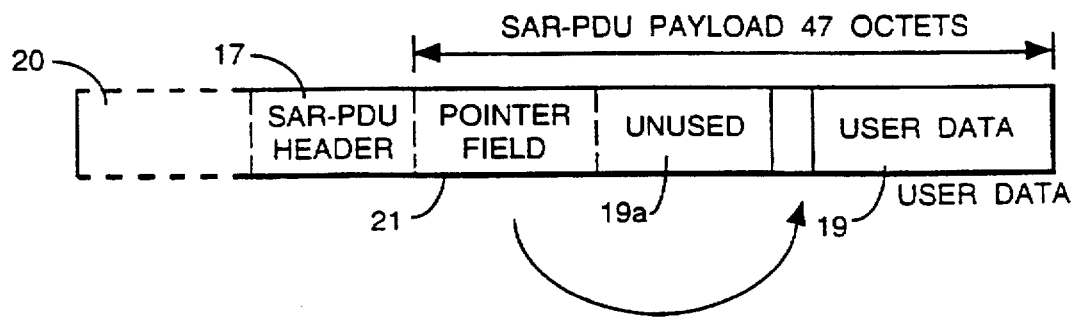

In an alternative embodiment of the invention, the SAR-PDU is configured in a slightly different way. As is shown in FIG. 5, where like reference numerals are used to signify like fields of the SAR-PDU generated in the earlier described embodiment, the unit has a header 17 a portion of user data 19 and an unused data storage area 19A. However, it will be seen that the user data is located towards the tail of the SAR-PDU with the unused data portion in front of it. Instead of a fill level indicator field 18 there is a pointer field 21 within which is stored a pointer to the location of the start of the user data 19. Again this is generated by the node manager 6 from the cell fill factor and loaded by the buffer 8. The user data area 19 can expand and contract to cater for different transmission path time delays in a similar manner to the earlier described embodiment. The pointer byte requires a value from 0 to 45 decimal that is 0000 0000 to 0010 1101 binary.

When the SAR-PDU is received by the node B, the cell fill indicator or the pointer will be used by that node to determine the amount of data it transmits in each data block in each ATM cell back to node A. Alternatively, node B could derive the appropriate cell filling factor in the same way as node A described above or it could be read from an initial connection set up data block, that is to say, a block not containing data concerned with user traffic but set up data, such as an appropriate cell filling factor derived by node A. This could be sent to node B prior to transmission of a block containing the data concerned with user traffic.

In alternative embodiments, the lookup table may be updated by a network manager in order to modify the network performance in the light of the network's current efficiency.

In some networks, where there is a danger of data corruption, a number of test cells may be sent to determine the transmission path time delay and the average or majority time delay used.

What is claimed is:

1. A method of communicating data in blocks between first and second nodes in a communications network, the method comprising:

determining a time delay between transmission and reception of data blocks between the nodes, communicating the data blocks, the amount of data in each of which is controlled in accordance with the time delay thus determined, the amount of data in each block being controlled to be larger for smaller delays and smaller for larger delays, and the blocks being communicated within respective data cells which all have the same data-carrying capacity so that the fill factor of each cell is higher for smaller delays and lower for larger delays.

2. A method as in claim 1 wherein:

the fill factor of the cells is determined by referring the determined time delay to a look-up table of appropriate cell fill factors corresponding to respective members of a set of time delays.

3. A method as in claim 1 wherein:

the time delay is determined for a communication path comprising a path from a first node to a second node and a path from the second node to the first node.

4. A method as in claim 3, wherein:

the time delay is determined by the first node transmitting a data cell to the second node, which cell contains data indicating its time of transmission, the second node re-transmitting said data in a data cell to the first node, and the first node comparing the time of arrival of said data from the second node with the time of transmission indicated by said data.

5. A method as in claim 1 wherein:

the communications network operates in asynchronous transfer mode.

6. A method as in claim 1 wherein:

each cell contains information indicating the amount of data contained in that cell.

7. A method as in claim 1 wherein:

each cell contains information indicating the location of data within that cell.

8. A communications network including:

first and second nodes, first means for communicating data in blocks between the nodes, second means for determining a time delay between transmission and reception of data blocks between the nodes, and third means for controlling the amount of data in each block to be larger for smaller delays and smaller for larger delays, the first means being arranged to communicate the blocks in respective data cells which all have the same data-carrying capacity so that the fill factor of each cell will be controlled by the third means to be higher for smaller delays and lower for larger delays.

9. A network as in claim 8 including:

a look-up table of appropriate cell fill factors corresponding to respective numbers of a set of time delays, and means for referring the output of the second means to the look-up table to determine a fill factor of the cells for use by the third means.

10. A network as in claim 8 constructed and arranged to operate as an asynchronous transfer mode communications network.

11. A network as in claim 8, wherein:

the first means is arranged to include, within each cell, information indicating the amount of data contained in that cell.

12. A network as in claim 8, wherein:

the first means is arranged to include, within each cell, information indicating the location of the data within that cell.

13. A method of communicating data cells transporting relatively constant average bit rate data from one node to another node within an asynchronous transfer mode network, said method comprising:

determining the time delay between transmission and reception of data cells between first and second nodes of the asynchronous transfer mode network; and adjusting the amount of data being transmitted in each data cell between said first and second nodes to be inversely related to the measured time delay.

14. Apparatus for communicating data cells transporting relatively constant average bit rate data from one node to another node within an asynchronous transfer mode network, said apparatus comprising:

means for determining the time delay between transmission and reception of data cells between first and second nodes of the asynchronous transfer mode network; and means for adjusting the amount of data being transmitted in each data cell between said first and second nodes to be inversely related to the measured time delay.

* * * * *